United States Patent
Aussel et al.

(10) Patent No.: US 12,119,772 B2
(45) Date of Patent: Oct. 15, 2024

(54) METHOD FOR MANAGING OVERCURRENT PROTECTION IN A SELF-CONTROLLED SYNCHRONOUS MACHINE WITH PERMANENT MAGNETS OF A MOTOR VEHICLE

(71) Applicant: VITESCO TECHNOLOGIES GmbH, Regensburg (DE)

(72) Inventors: Michel Aussel, Toulouse (FR); Karim Boukhris, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 8 days.

(21) Appl. No.: 17/761,702

(22) PCT Filed: Sep. 18, 2020

(86) PCT No.: PCT/EP2020/076135
§ 371 (c)(1),
(2) Date: Mar. 18, 2022

(87) PCT Pub. No.: WO2021/053162
PCT Pub. Date: Mar. 25, 2021

(65) Prior Publication Data
US 2022/0345069 A1   Oct. 27, 2022

(30) Foreign Application Priority Data

Sep. 19, 2019   (FR) ...................................... 1910331

(51) Int. Cl.
*H02P 27/06*   (2006.01)
*H02P 29/024*   (2016.01)
*H02P 29/60*   (2016.01)

(52) U.S. Cl.
CPC ............ *H02P 29/027* (2013.01); *H02P 29/60* (2016.02); *H02P 27/06* (2013.01)

(58) Field of Classification Search
CPC ......... H02P 27/06; H02P 29/027; H02P 29/60
See application file for complete search history.

(56) References Cited

U.S. PATENT DOCUMENTS 8,134,330 B2 *   3/2012   Alles ...................... H02P 25/06
                                                          318/135
8,279,565 B2 *   10/2012   Hall ..................... H02H 7/0816
                                                          318/434

(Continued)

FOREIGN PATENT DOCUMENTS

| CN | 102150338 A | 8/2011 |
| CN | 104081054 A | 10/2014 |

OTHER PUBLICATIONS

International Search Report for PCT/EP2020/076135 dated Dec. 10, 2020, 6 pages.

(Continued)

*Primary Examiner* — Thai T Dinh
(74) *Attorney, Agent, or Firm* — NIXON & VANDERHYE

(57) ABSTRACT

A method for managing overcurrent protection in a self-controlled permanent-magnet synchronous motor of a motor vehicle is disclosed. The method makes it possible to adjust the activation threshold for overcurrent protection in the synchronous motor. In particular, the activation threshold is variable and depends, inter alia, on parameters representative of the temperature of the components of the synchronous motor.

20 Claims, 3 Drawing Sheets

(56) References Cited

U.S. PATENT DOCUMENTS

| | | | |
|---|---|---|---|
| 8,964,338 B2* | 2/2015 | Wallis | F04C 28/28 |
| | | | 318/434 |
| 9,735,726 B2* | 8/2017 | Glenn | H02P 29/0241 |
| 2013/0169205 A1* | 7/2013 | Kakihara | H02P 29/0243 |
| | | | 318/400.22 |
| 2013/0176649 A1* | 7/2013 | Wallis | F04B 35/04 |
| | | | 361/31 |
| 2015/0025703 A1 | 1/2015 | Vander Laan et al. | |
| 2015/0138682 A1 | 5/2015 | Ueta et al. | |
| 2015/0211533 A1* | 7/2015 | Nagata | F04C 28/06 |
| | | | 318/369 |
| 2016/0336729 A1 | 11/2016 | Sakanobe et al. | |

OTHER PUBLICATIONS

Written Opinion of the ISA for PCT/EP2020/076135 dated Dec. 10, 2020, 6 pages.
Office Action issued in Chinese Patent Application No. 202080065625.X dated Jul. 18, 2023.

* cited by examiner

[Fig. 2]

METHOD FOR MANAGING OVERCURRENT PROTECTION IN A SELF-CONTROLLED SYNCHRONOUS MACHINE WITH PERMANENT MAGNETS OF A MOTOR VEHICLE

CROSS-REFERENCE TO RELATED APPLICATIONS

This application is the U.S. national phase of International Application No. PCT/EP2020/076135 filed Sep. 18, 2020 which designated the U.S. and claims priority to FR 1910331 filed Sep. 19, 2019, the entire contents of each of which are hereby incorporated by reference.

BACKGROUND OF THE INVENTION

Field of the Invention

The present invention relates, in general, to self-controlled permanent-magnet synchronous motors for motor vehicles. It relates, more particularly, to a method for managing overcurrent protection in such a motor. The invention is applicable, in particular, to motor vehicles equipped with such a synchronous motor used to drive the turbine of an electric compressor.

Description of the Related Art

Such an electric compressor may be used in vehicles equipped with only a combustion engine or in hybrid motor vehicles, the latter being increasingly popular because of the savings in fossil fuels they allow to be made. In particular, in such hybrid vehicles, an electric motor may contribute to generating the engine torque which makes it possible to drive the vehicle, in addition to the combustion engine. This configuration therefore makes it possible to reduce the fuel consumption of the vehicle in comparison with motor vehicles equipped with only a combustion engine and, consequently, to reduce the pollution generated by said vehicle when it is in operation. Furthermore, depending in particular on its placement in the vehicle and on its power, various known uses may be made of the electric motor. Specifically, depending on the case, it may by itself generate the engine torque which drives the vehicle, it may supplement the torque generated by the combustion engine, it may be used to place the combustion engine in a particular position (so as make it easier to start, for example) or it may be used in generator mode to charge a battery, either by producing electrical energy from some of the mechanical energy produced by the combustion engine, or by harvesting some of the kinetic energy of the vehicle during a braking phase.

Another known use of an electric motor in a motor vehicle equipped with a combustion engine is that in which said electric motor is integrated into an electronically controlled compressor (also called an "electric compressor" for short, or "e-compressor", in the jargon of those skilled in the art.) In this case, the electric motor drives the turbine of the compressor, the role of which is to take in and to compress a gas. The electric compressor is situated upstream of the intake of the combustion engine and is used either to inject more are into the intake of the combustion engine (for example a spark-ignition engine, or petrol engine). The aim is to increase the engine torque produced by the combustion engine, to optimize consumption and to minimize the emission of pollutants. In particular at low speed, that is to say for a small number of rotations per minute of the combustion engine.

A type of electric motor widely used for this type of function is a permanent-magnet synchronous motor (PMSM). In such a motor, the rotor of an electric motor is composed of permanent magnets whereas the stator of the motor comprises a plurality of coils which generate a magnetic field under the influence of a current which drives the rotor to rotate. In certain PMSMs, referred to as self-controlled PMSMs, the control currents which are sent through the coils of the stator are generated by an electronic control system called an inverter.

Furthermore, this type of synchronous motor is commonly equipped with an overcurrent protection (OCP) system. Specifically, the currents which flow through the various components of such a synchronous motor vary according to the required engine torque. However, said components may be damaged when these currents are too large. In addition, the thresholds above which the risks of damage become high depend on particular parameters associated with the usage conditions of the synchronous motor. Typically, for example, the lower the temperature of a component, the higher the current the latter is able to tolerate. Conversely, when a component heats up, the same current value risks causing it to deteriorate faster.

Now, in the solutions of the prior art, the threshold current value used to activate an overcurrent protection method is a set value. It is predetermined taking into consideration usage conditions of the motor which are characteristic of the most unfavorable case, or worst case. In other words, the control current for the electric motor of such a PMSM is intentionally restricted, without taking the actual usage conditions of the motor (which may be less unfavorable than the conditions of the worst case) into account, in order not to risk degrading the components of said motor.

SUMMARY OF THE INVENTION

The invention aims to provide an alternative to the solutions of the aforementioned prior art by providing a method making it possible to adjust the activation threshold for overcurrent protection to the actual usage conditions of a self-controlled permanent-magnet synchronous motor. This activation threshold is determined dynamically and may thus vary depending on useful parameters which make it possible to determine whether or not activating the protection is appropriate. In particular, this determination takes a plurality of indicators of the temperature of the components of the synchronous motor into account in order to have reliable information as to this temperature and as to the actual risk of the components being damaged by too high a current. Finally, the method guarantees that it will be possible to make use of a greater power for the synchronous motor when the usage conditions of said motor allow it, without however risking its components being damaged.

To this end, a first aspect of the invention provides a method for managing overcurrent protection in a self-controlled permanent-magnet synchronous motor of a motor vehicle, said self-controlled permanent-magnet synchronous motor comprising an electric motor and an electronic control system for said electric motor, said motor vehicle comprising a heat transfer fluid-based cooling system suitable for cooling the components of said electronic control system and of said electric motor, said method comprising the following steps, carried out by a control unit for the self-controlled permanent-magnet synchronous motor:

receiving external measurement data, said external measurement data comprising data representative of the temperature of the heat transfer fluid of the cooling system;

receiving internal measurement data, said internal measurement data comprising information representative of the state of the electronic control system and of the electric motor;

determining a limit current value on the basis of the internal measurement data, on the one hand, and of the external measurement data, on the other hand;

receiving a value representative of a control current for the self-controlled permanent-magnet synchronous motor;

and, if and only if the value representative of a control current is greater than the limit current value:

activating an overcurrent protection method.

Implementations taken in isolation or in combination further anticipate that:

the external measurement data are received, by the control unit for the self-controlled permanent-magnet synchronous motor, via a CAN data bus from an engine control unit of the motor vehicle;

the internal measurement data comprise the following data:

the temperature at a coil of a stator of the electric motor; and the temperature of the electronic control system;

a limit current value is determined using a calibration table based on predetermined limit values of internal measurement data and of external measurement data;

the external measurement data further comprise data representative of a determined engine torque required by a user of the motor vehicle acting on the controls of the vehicle;

the value representative of a control current for the self-controlled permanent-magnet synchronous motor corresponds to the measured value of an instantaneous control current to which filtering suitable for eliminating noise causing parasitic fluctuations in said instantaneous control current has been applied;

the self-controlled permanent-magnet synchronous motor is contained in an electronic compressor of the motor vehicle and is suitable for interacting with a turbine of said electronic compressor so as to generate an intake of air or of gas;

the overcurrent protection method is performed by hardware means suitable for cutting the power supply of the electronic control system; and the overcurrent protection method is performed by software means suitable for cutting the power supply of the electronic control system.

In a second aspect, another subject of the invention is a control unit for a self-controlled permanent-magnet synchronous motor comprising means suitable for carrying out the steps of the method according to the first aspect.

In a third aspect, another subject of the invention is a self-controlled permanent-magnet synchronous motor comprising a control unit according to the second aspect.

BRIEF DESCRIPTION OF THE DRAWINGS

Other features and advantages of the invention will become more apparent on reading the following description. The latter is purely illustrative and must be read with reference to the appended drawings, which show.

DESCRIPTION OF THE PREFERRED EMBODIMENTS

Figure 1:
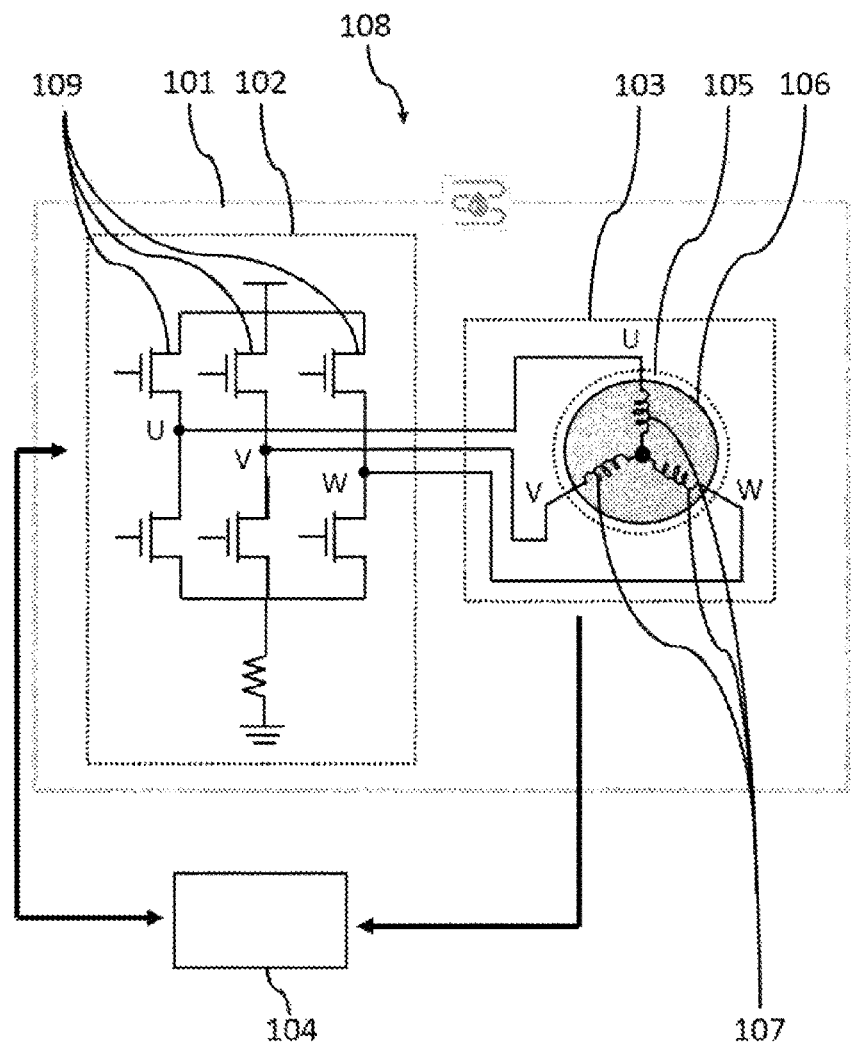
FIG. 1 is a simplified diagram of a self-controlled permanent-magnet synchronous motor in which the method according to the invention may be implemented.

In the following description of embodiments and in the figures of the appended drawings, the same elements or similar elements have been designated by the same reference numbers in the drawings.

FIG. 1 shows a schematic representation of a self-controlled permanent-magnet synchronous motor in which the method according to the invention may be implemented. This synchronous motor is integrated into a motor vehicle. Furthermore, in one particular embodiment, this self-controlled permanent-magnet synchronous motor is contained in an electronic compressor of the motor vehicle and suitable for interacting with a turbine of said electronic compressor so as to generate an intake of air or of exhaust gas. The permanent-magnet synchronous motor, also called a PMSM, is referred to as "self-controlled" in reference to the fact that it does not use a slip ring (which would interact with brushes) to make an electrical connection with the windings of the rotor of an electric motor in the context of controlling the motor. Thus, a brushless DC (BLDC) electric motor is also spoken of.

The self-controlled permanent-magnet synchronous motor 108 comprises an electronic control system 102 which is suitable for controlling the electric motor 103. The assembly is controlled by a control unit 104, which controls the electronic control system 102, via a driver (not shown), so that the electronic control system 102 generates the control signal making it possible to drive the rotation of a rotor 106 of the electric motor 103.

More specifically, it is well known that it is a rotating magnetic field being generated by sending current through the coils 107 of the stator 105 of the electric motor 103, which correspond to the phases U, V and W, respectively, which makes it possible for the rotor 106 to be driven and therefore for the crankshaft of the engine to which the rotor is rigidly coupled to be driven to rotate. The current in the coils 107 is controlled by applying, to each of the phases U, V and W, periodic signals which are generated by the electronic control system 102. Furthermore, by using, for example, modulation of the width of the pulses forming these periodic signals (with a given duty cycle) and/or phase advance of the control (with a given angular value), the value of the engine torque generated by the electric motor is caused to vary.

In the example shown, the electronic control system 102, for example an inverter, is a printed circuit board (PCB) which integrates transistors 109, the function of which is, in turn, for the various phases U, V and W, to transfer a current, to block it or even to reverse its direction so as to make it possible for the coils of the stator to generate a magnetic field to drive the rotor of the electric motor in response to a determined required engine torque.

Lastly, the control unit, typically a microcontroller, uses information on the state of various phases and the supply current and, where applicable, information on the angular position of the rotor (determined, for example, by a Hall-effect sensor) to control the electronic control system and therefore ultimately to control the engine torque generated by the self-controlled permanent-magnet synchronous motor.

Besides the various elements of the self-controlled permanent-magnet synchronous motor which were described above, the motor vehicle equipped with said motor also comprises a heat transfer fluid-based cooling system 101 suitable for cooling the components of the electronic control system and of the electric motor (i.e. in particular the transistors and the coils) of the self-controlled permanent-magnet synchronous motor. As is well known to those skilled in the art, such a cooling system makes it possible to cause a cold fluid, for example a liquid such as glycol (also called the coolant), to flow through ducts passing near the components in question. The components are then cooled by said fluid absorbing and removing heat.

In a vehicle equipped with such a heat transfer fluid-based cooling system, said system is conventionally controlled by an engine control unit (ECU) of the motor vehicle. Furthermore, in this case the ECU is suitable for measuring the temperature of the coolant in the cooling system in real time so as to control the cooling function.

Figure 2:
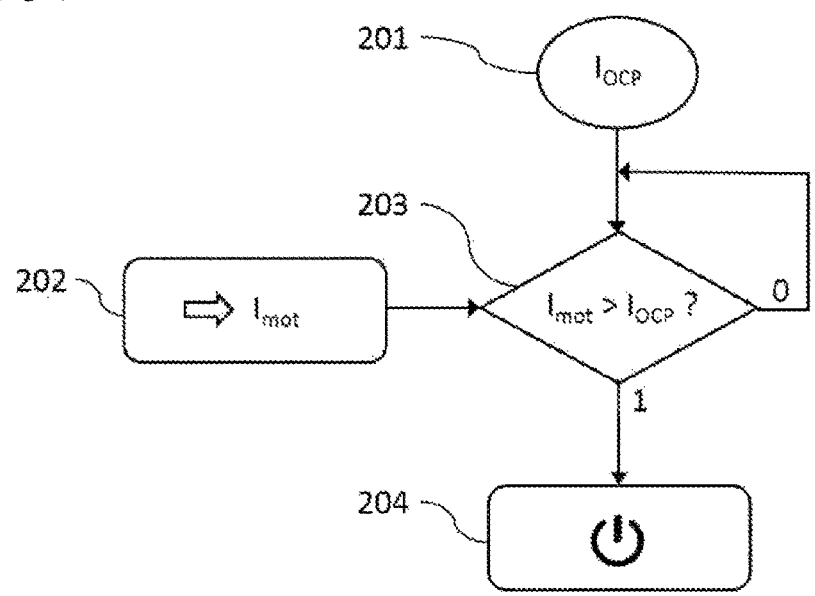
FIG. 2 is a diagram of the steps of a method for managing overcurrent protection in a self-controlled permanent-magnet synchronous motor according to the prior art.

FIG. 2 shows a diagram of steps of a method for managing overcurrent protection in a self-controlled permanent-magnet synchronous motor according to the prior art. The steps of the method are carried out by a control unit for a self-controlled permanent-magnet synchronous motor in accordance with the one described with reference to FIG. 1.

It will be recalled that, in the approaches known up to now, the threshold current value above which an overcurrent protection method (or strategy) is activated is a set and predetermined input datum. The block 201 illustrates this input datum of the process.

The 202 corresponds, for its part, to receiving a value representative of a control current Imot for the self-controlled permanent-magnet synchronous motor. Specifically, as was stated with reference to FIG. 1, the control unit which carries out the method continually receives data representative of the control currents for each of the phases of the motor electric. More specifically, conventionally, respective current values in two of the phases are actually measured, and the value of the current in the third phase is calculated on the basis of the property of a balanced system according to which the sum of the three currents is zero.

Thus, the block 203 illustrates the fact that the following step is performed if and only if the value representative of a control current Imot received in the step 202 is greater than the predetermined limit current value IOCP. Furthermore, as those skilled in the art will appreciate, the value representative of a control current Imot may be that of any one of the phases of the electric motor.

Lastly, the step 204 consists in actually activating an overcurrent protection method. In the various implementations of the method, the overcurrent protection method may be performed either by software means suitable for cutting the power supply of the electronic control system, or by software means suitable for cutting the power supply of the electronic control system. For example, in the case of hardware means, these may be a component of driving comparator type which blocks the flow of current when the latter exceeds a threshold value. In another example, in the case of software means, these may be a filtering function, with a determined threshold, implemented in the control unit itself.

Figure 3:
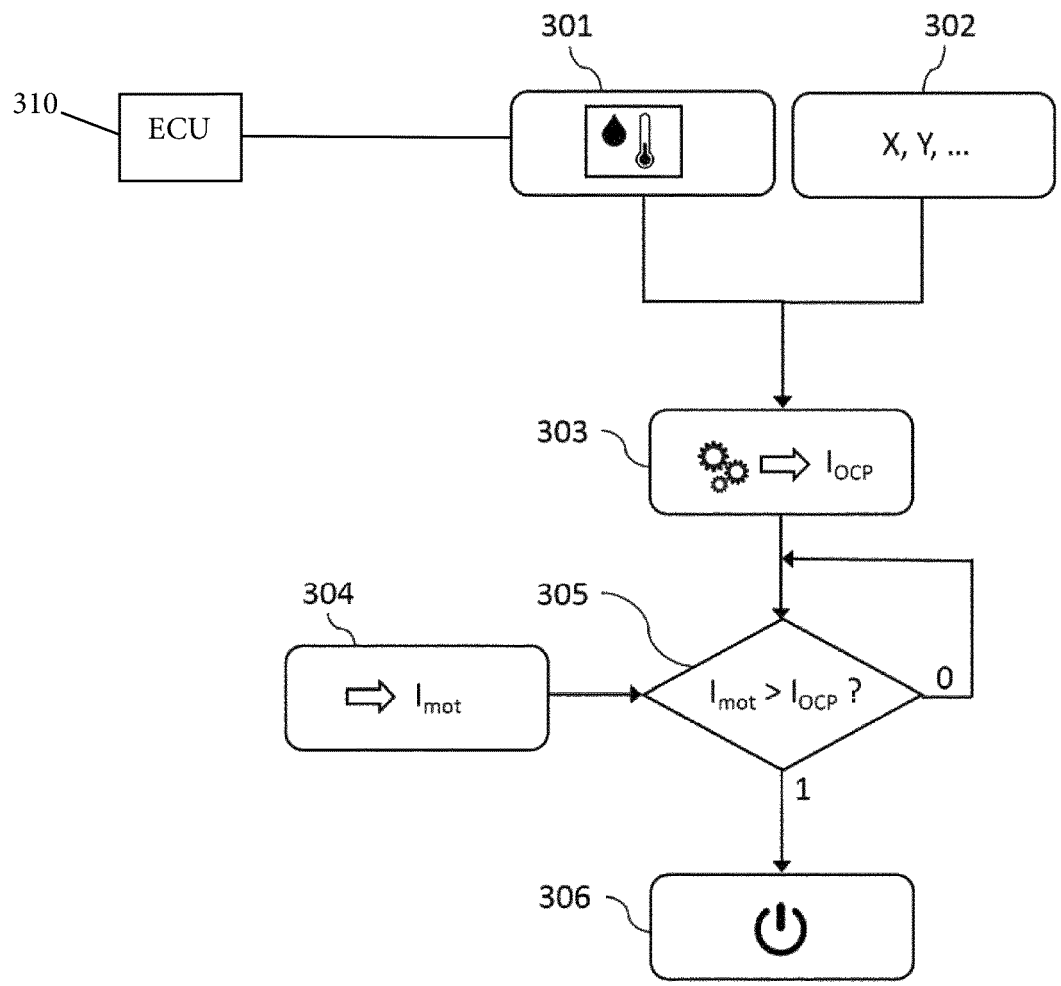
FIG. 3 is a diagram of steps of a method for managing overcurrent protection in a self-controlled permanent-magnet synchronous motor according to implementations of the invention.

FIG. 3 shows a diagram of steps of a method for managing overcurrent protection in a self-controlled permanent-magnet synchronous motor according to the invention. In the same way as for the method of the prior art, the steps of the method are carried out by a control unit for a self-controlled permanent-magnet synchronous motor in accordance with the one described with reference to FIG. 1.

The step 301 consists in receiving external measurement data. What is meant by "external measurement data" is measurement data received by the control unit from equipment of the motor vehicle which is external to the self-controlled permanent-magnet synchronous motor. For example, in one particular implementation, these data are received, via a CAN (controller area network) data bus, from an engine control unit (ECU) 310 of the motor vehicle. Furthermore, in any case, these external measurement data comprise data representative of the temperature of the coolant of the liquid cooling system. Advantageously, it has been shown that the change in the temperature of the coolant relatively faithfully reflects the temperature of the various components of the self-controlled permanent-magnet synchronous motor.

In one particular implementation of the method, external measurement data further comprise data the representative of a determined engine torque required by a user of the motor vehicle acting on the controls of the vehicle in the driving phase in question. Specifically, attempting to generate an engine torque beyond a certain limit by means of the electric motor would risk damaging the shaft driven by this motor. Taking the value of the requested torque into account makes it possible to prevent a control current which would cause such a limit engine torque to be exceeded from being reached.

In the step 302, the control unit receives internal measurement data. In contrast to the external measurement data, what is meant by "internal measurement data" is measurement data received by the control unit from the various entities of the self-controlled permanent-magnet synchronous motor itself. Thus, these may be measurement data from the electronic control system, from the electric motor or from a sensor associated with one of these entities. In any case, these internal measurement data comprise information representative of the state of the electronic control system and of the electric motor.

For example, in one particular implementation of the method, the internal measurement data comprise the temperature of the coils of the stator of the electric motor and/or the temperature of the electronic control system. For example, the temperature of the coils is measured by one or more temperature sensors and the temperature of the electronic control system is known to said electronic control system when, for example, it is a circuit such as a microcontroller natively integrating a temperature sensor. As a variant, the temperature at the electronic control system may also be measured by a separate sensor.

The step 303 consists, for its part, in determining a limit current value IOCP on the basis both of the internal measurement data and of the external measurement data. For example, in one particular implementation of the method, this determination is performed using a calibration table based on predetermined limit values of internal measurement data and of external measurement data. In other words, depending on whether this or that measurement datum belongs to this or that range of values, a determined limit current value is associated therewith. Furthermore, as those skilled in the art will appreciate, the method may be carried out continuously, and this limit current value may thus change depending on the latest, external or internal, measurement data received by the control unit. Advantageously, this limit current value is thus determined dynamically. Furthermore, this limit current value is used, in the remainder of the method, as an activation threshold for overcurrent protection. Consequently, the activation of overcurrent protection may be adjusted to take the actual usage conditions of the synchronous motor into account and thus prevent superficial activation.

The other steps of the method are identical to those described with reference to the prior-art method described above.

Thus, the step 304 corresponds to receiving a value representative of a control current Imot for the self-controlled permanent-magnet synchronous motor. Furthermore, in one particular implementation, the value representative of the control current Imot corresponds to the measured value of an instantaneous control current (of any phase of the motor) to which filtering suitable for eliminating noise causing parasitic fluctuations in said instantaneous control current has been applied.

Then, the value representative of a control current Imot received in the step 304 is compared in 305 to the limit current value IOCP determined in the steps 301, 302 and 303 presented above. The following step 306 is carried out only if the control current is greater than the limit value IOCP. Otherwise, the process loops back to a new test of the value Imot, which is possibly replaced by a new received value.

Lastly, in the same way as for the method according to the prior art, the step 306 consists in activating an overcurrent protection method. Here again, the overcurrent protection method may be performed either by software means suitable for cutting the power supply of the electronic control system, or by hardware means suitable for cutting the power supply of the electronic control system.

In summary, the described method makes it possible to adjust the activation threshold for overcurrent protection in the synchronous motor. In particular, the activation threshold is variable and depends, inter alia, on parameters representative of the actual temperature of the components of the synchronous motor. It is thus possible to escape the limitations implied by the use in the prior art of a current threshold value which is set, and predetermined considering usage conditions of the motor which are characteristic of the most unfavorable use case.

In the claims, the term "comprise" or "contain" does not exclude other elements or other steps. A single processor or a plurality of other units may be used to implement the invention. The various presented and/or claimed features may advantageously be combined. Their presence in the description or in different dependent claims does not exclude this possibility. The reference signs should not be understood as limiting the scope of the invention.

The invention claimed is:

1. A method for managing overcurrent protection in a self-controlled permanent-magnet synchronous motor of a motor vehicle, said self-controlled permanent-magnet synchronous motor including an electric motor and an electronic control system for said electric motor, said motor vehicle including a heat transfer fluid-based cooling system configured to cool components of said electronic control system and said electric motor, said method, carried out by a synchronous motor controller for the self-controlled permanent-magnet synchronous motor, the method comprising:

receiving external measurement data comprising data representative of a temperature of a heat transfer fluid of the heat transfer fluid-based cooling system;

receiving internal measurement data comprising information representative of a state of the electronic control system and a state of the electric motor;

determining a limit current value based on both the internal measurement data and the external measurement data;

receiving a value representative of a control current for the self-controlled permanent-magnet synchronous motor; and only when the value representative of the control current is greater than the limit current value: activating an overcurrent protection method to cut the power supply of the electronic control system.

2. The method as claimed in claim 1, wherein the external measurement data are received, by the synchronous motor controller for the self-controlled permanent-magnet synchronous motor, via a controller area network (CAN) data bus from an engine controller of the motor vehicle.

3. The method as claimed in claim 2, wherein the internal measurement data comprise the following data:

the temperature at a coil of a stator of the electric motor and the temperature of the electronic control system.

4. The method as claimed in claim 2, wherein a limit current value is determined using a calibration table based on predetermined limit values of the internal measurement data and the external measurement data.

5. The method as claimed in claim 2, wherein the external measurement data further comprise data representative of a determined engine torque required by a user of the motor vehicle acting on controls of the vehicle.

6. The method as claimed in claim 2, wherein the value representative of a control current for the self-controlled permanent-magnet synchronous motor corresponds to the measured value of an instantaneous control current to which filtering that eliminates noise causing parasitic fluctuations in said instantaneous control current has been applied.

7. The method as claimed in claim 1, wherein the internal measurement data comprise the following data:

the temperature at a coil of a stator of the electric motor and the temperature of the electronic control system.

8. The method as claimed in claim 7, wherein a limit current value is determined using a calibration table based on predetermined limit values of the internal measurement data and the external measurement data.

9. The method as claimed in claim 7, wherein the external measurement data further comprise data representative of a determined engine torque required by a user of the motor vehicle acting on controls of the vehicle.

10. The method as claimed in claim 7, wherein the value representative of a control current for the self-controlled permanent-magnet synchronous motor corresponds to the measured value of an instantaneous control current to which filtering that eliminates noise causing parasitic fluctuations in said instantaneous control current has been applied.

11. The method as claimed in claim 1, wherein a limit current value is determined using a calibration table based on predetermined limit values of the internal measurement data and the external measurement data.

12. The method as claimed in claim 11, wherein the external measurement data further comprise data representative of a determined engine torque required by a user of the motor vehicle acting on controls of the vehicle.

13. The method as claimed in claim 1, wherein the external measurement data further comprise data representative of a determined engine torque required by a user of the motor vehicle acting on controls of the vehicle.

14. The method as claimed in claim 1, wherein the value representative of a control current for the self-controlled permanent-magnet synchronous motor corresponds to the measured value of an instantaneous control current to which filtering that eliminates noise causing parasitic fluctuations in said instantaneous control current has been applied.

15. The method as claimed in claim 1, wherein the self-controlled permanent-magnet synchronous motor is contained in an electronic compressor of the motor vehicle and is configured to interact with a turbine of said electronic compressor to generate an intake of air or of gas.

16. The method as claimed in claim 1, wherein the method is performed d by hardware configured to cut the power supply of the electronic control system.

17. The method as claimed in claim 1, wherein the overcurrent protection method is performed by software configured to cut the power supply of the electronic control system.

18. The method as claimed in claim 1, wherein the limit current value is determined dynamically based on receiving the external measurement data and the internal measurement data dynamically.

19. A controller for a self-controlled permanent-magnet synchronous motor comprising:
at least one processor configured to:
receive external measurement data comprising data representative of a temperature of a heat transfer fluid of a heat transfer fluid-based cooling system configured to cool components of an electronic control system for an electric motor and the electric motor,
receive internal measurement data comprising information representative of a state of the electronic control system and the electric motor,
determine a limit current value based on both the internal measurement data and the external measurement data,
receive a value representative of a control current for the self-controlled permanent-magnet synchronous motor, and
only when the value representative of the control current is greater than the limit current value: activate an overcurrent protection method to cut the power supply of the electronic control system.

20. A self-controlled permanent-magnet synchronous motor comprising:
an electric motor comprising a plurality of electric motor components;
an electronic control system configured to control the electric motor, the electronic control system comprising a plurality of electronic control system components; and
a controller comprising:
at least one processor configured to:
receive external measurement data comprising data representative of a temperature of a heat transfer fluid of a heat transfer fluid-based cooling system configured to cool the electronic control system components of the electronic control system and the electric motor components of the electric motor,
receive internal measurement data comprising information representative of a state of the electronic control system and the electric motor,
determine a limit current value based on both the internal measurement data and the external measurement data,
receive a value representative of a control current for the self-controlled permanent-magnet synchronous motor, and
only when the value representative of the control current is greater than the limit current value: activate an overcurrent protection method to cut the power supply of the electronic control system.

* * * * *